(No Model.) 7 Sheets—Sheet 1.

Z. B. COES.
TURRET LATHE.

No. 535,487. Patented Mar. 12, 1895.

Witnesses:
E. R. Shipley.
C. M. Shinhan.

Inventor
Zorister B. Coes
by James W. See
Attorney.

(No Model.) 7 Sheets—Sheet 2.

Z. B. COES.
TURRET LATHE.

No. 535,487. Patented Mar. 12, 1895.

Witnesses:
E. R. Shipley.
C. M. Sheehan.

Zorester B Coes
Inventor
by James W See
Attorney.

(No Model.) 7 Sheets—Sheet 3.

Z. B. COES.
TURRET LATHE.

No. 535,487. Patented Mar. 12, 1895.

Witnesses:
E. R. Shipley
C. M. Shurman

Zoresters B. Coes
Inventor
by James W. See
Attorney (No Model.) 7 Sheets—Sheet 4.

Z. B. COES.
TURRET LATHE.

No. 535,487. Patented Mar. 12, 1895.

Witnesses:

Inventor
Zorester B Coes
by James W. See
Attorney (No Model.) 7 Sheets—Sheet 5.
Z. B. COES.
TURRET LATHE.
No. 535,487. Patented Mar. 12, 1895.
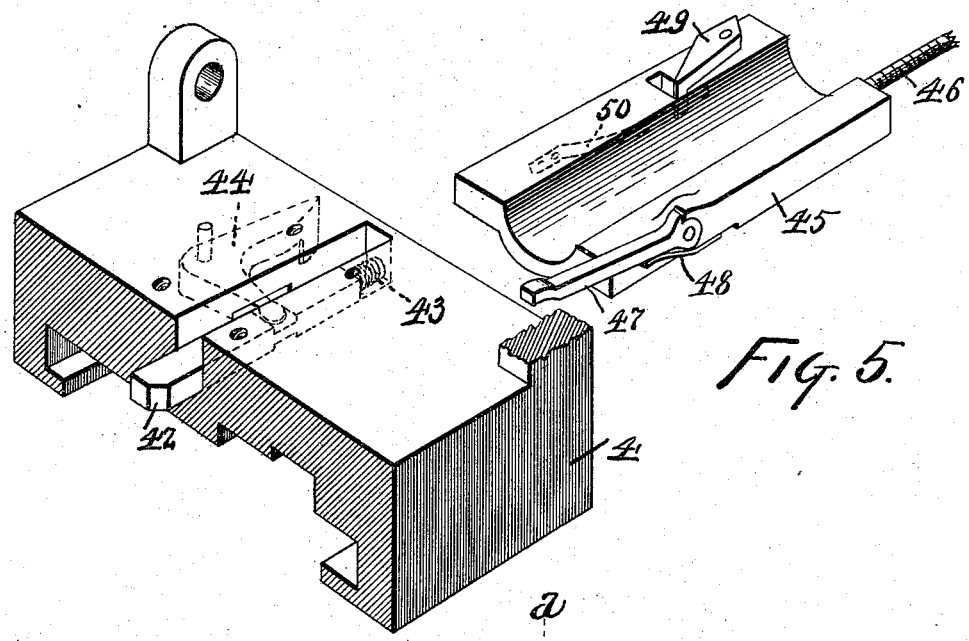
Fig. 5.
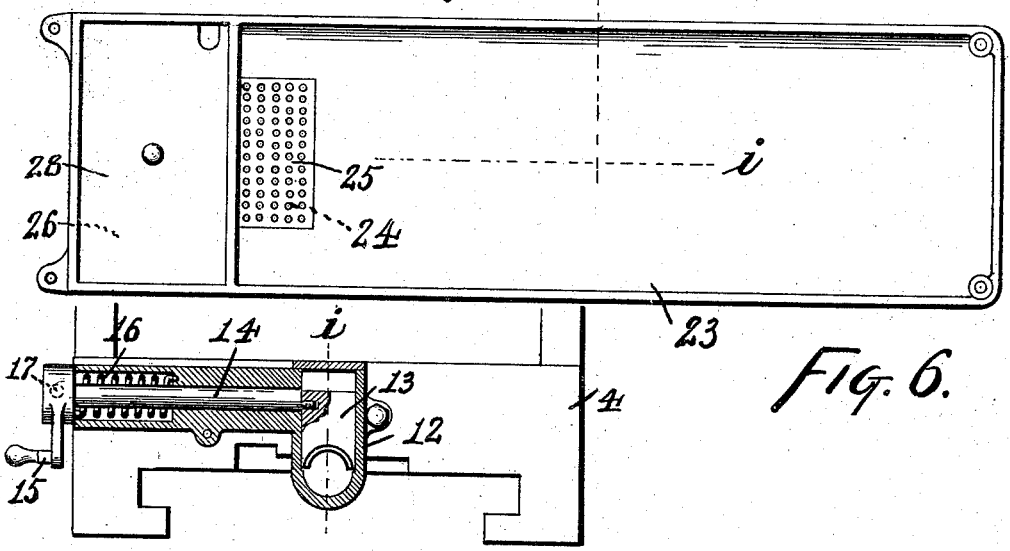
Fig. 6.
Fig. 7.
Witnesses:
E. R. Shipley
C. M. Sherman
Zorester B. Coes
Inventor
by James W. See
Attorney (No Model.) 7 Sheets—Sheet 6.

Z. B. COES.
TURRET LATHE.

No. 535,487. Patented Mar. 12, 1895.

Witnesses:
E. R. Shipley.
C. M. Shurtan.

Zvester B. Coes
Inventor
by James W. See
Attorney

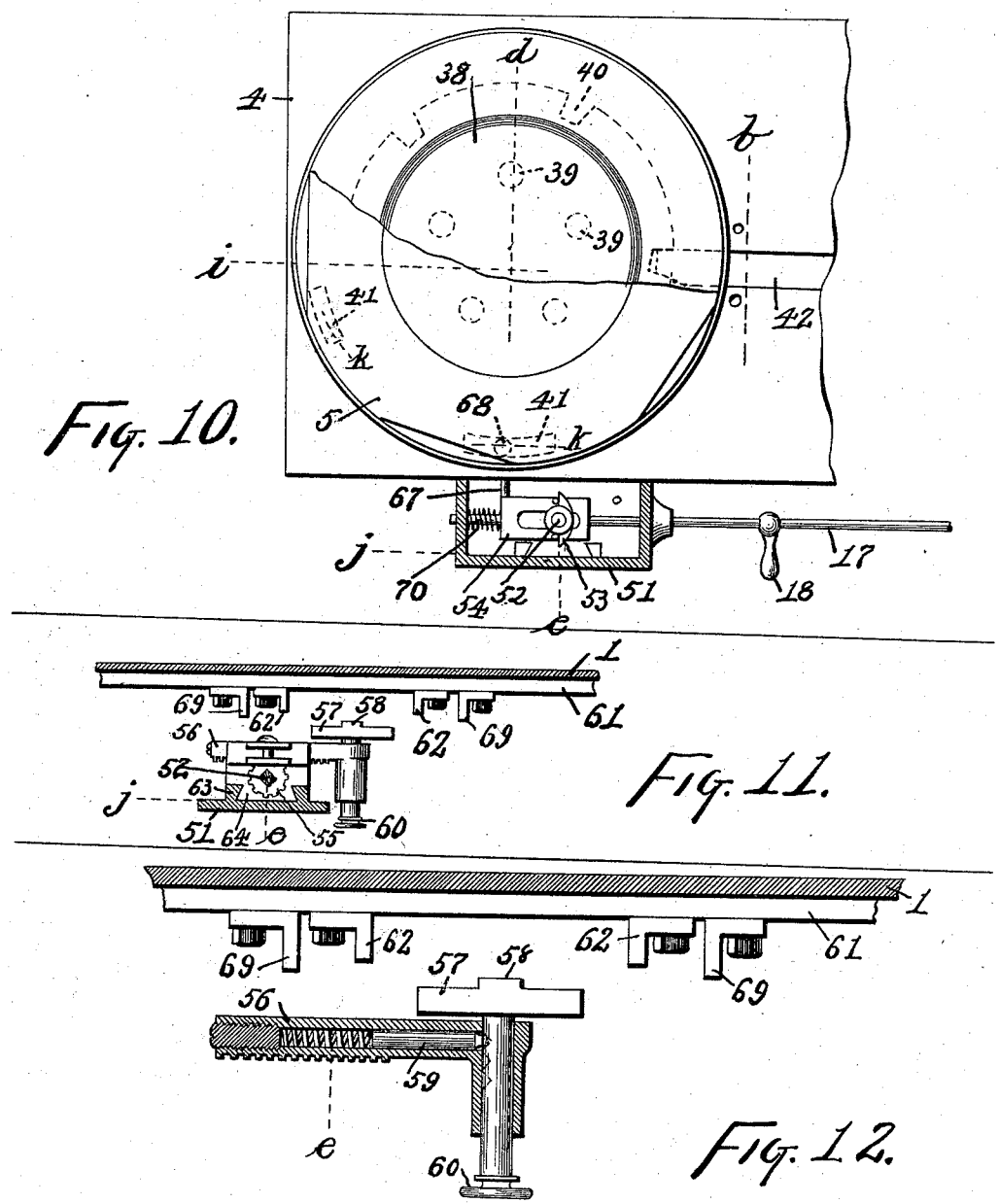

UNITED STATES PATENT OFFICE.

ZORESTER B. COES, OF HAMILTON, OHIO, ASSIGNOR TO THE NILES TOOL WORKS COMPANY, OF SAME PLACE.

TURRET-LATHE.

SPECIFICATION forming part of Letters Patent No. 535,487, dated March 12, 1895.

Application filed May 21, 1894. Serial No. 511,883. (No model.)

*To all whom it may concern:*

Be it known that I, ZORESTER B. COES, of Hamilton, Butler county, Ohio, have invented certain new and useful Improvements in Turret-Lathes, of which the following is a specification.

My improvements in turret lathes will be readily understood from the following description taken in connection with the accompanying drawings, in which—

Figure 1:
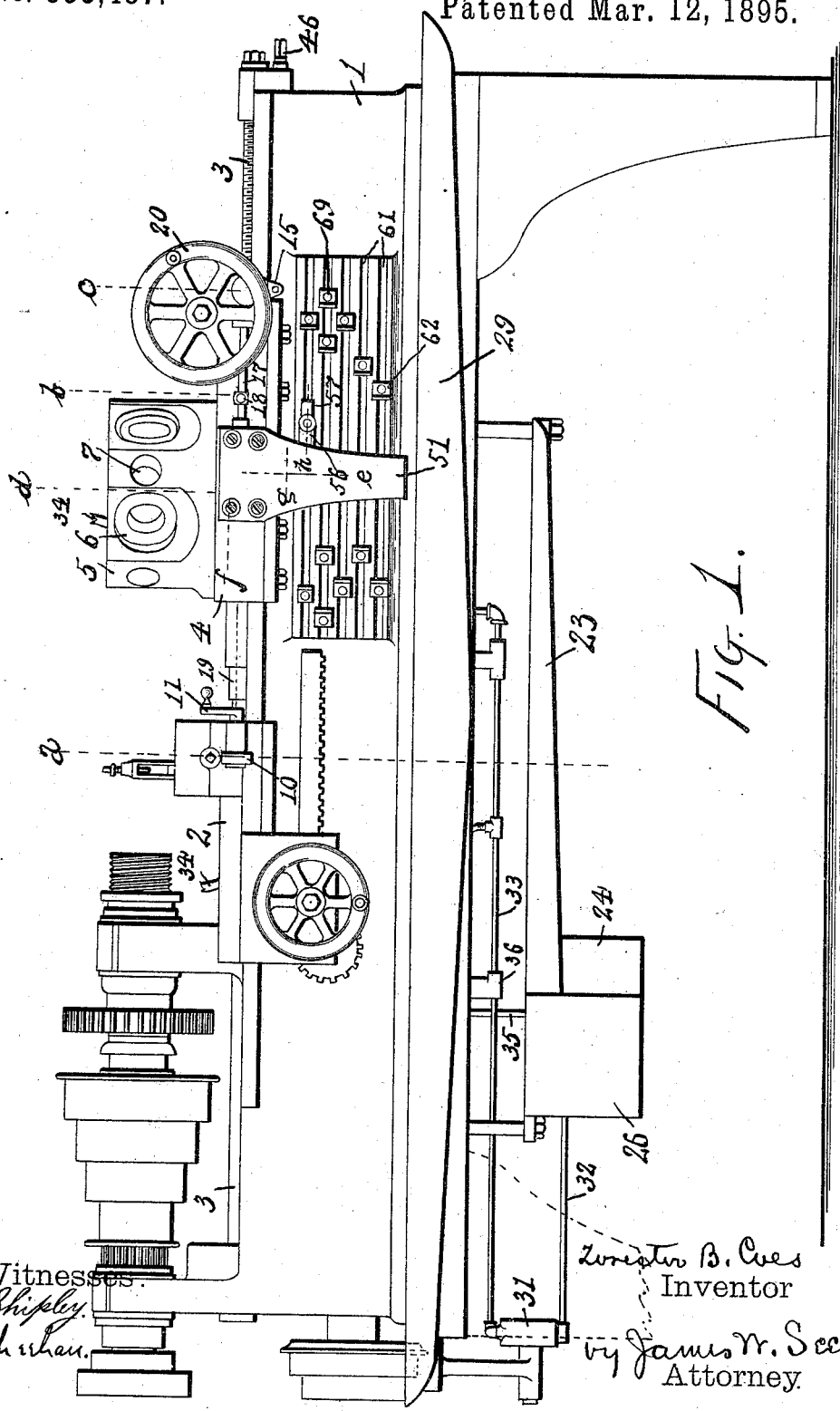
Figure 2:
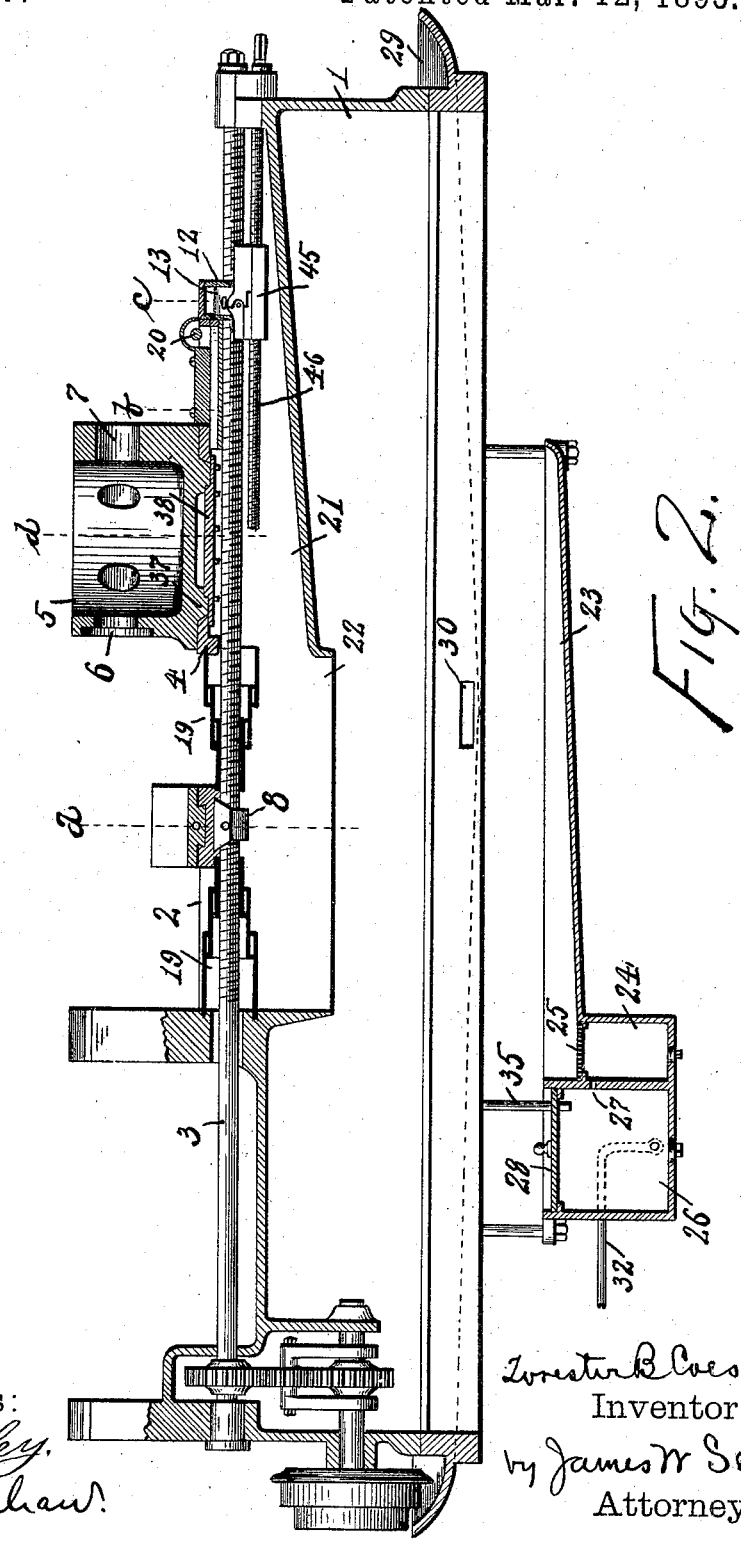
Figure 3:
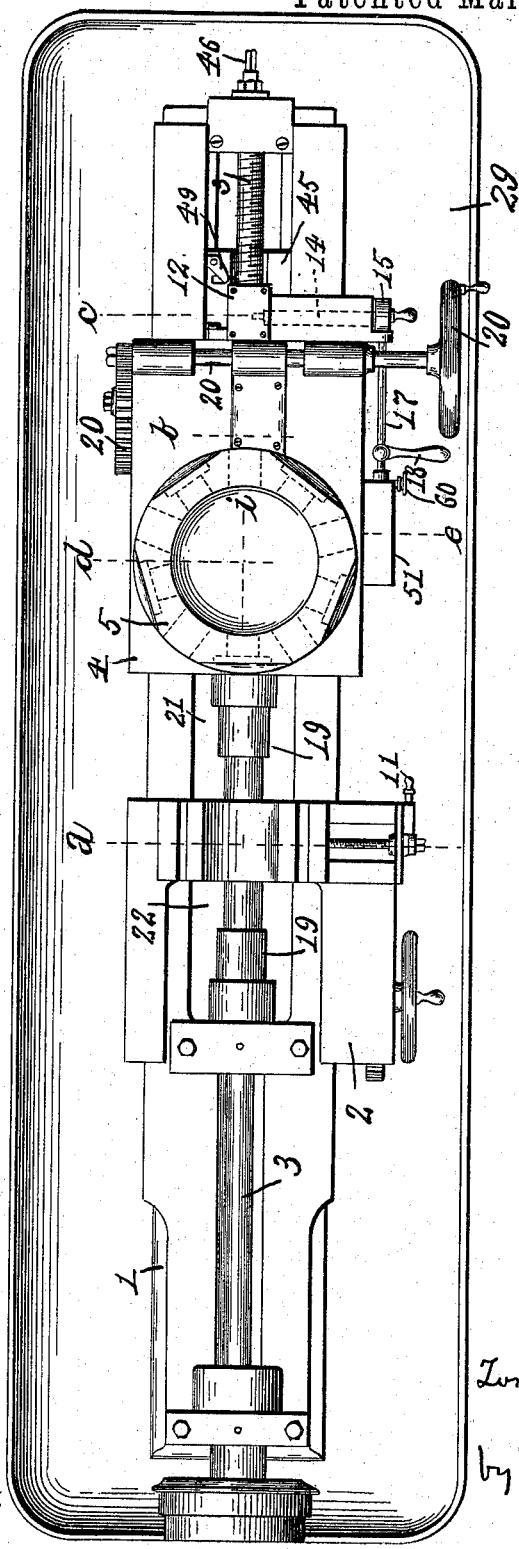
Figure 4:
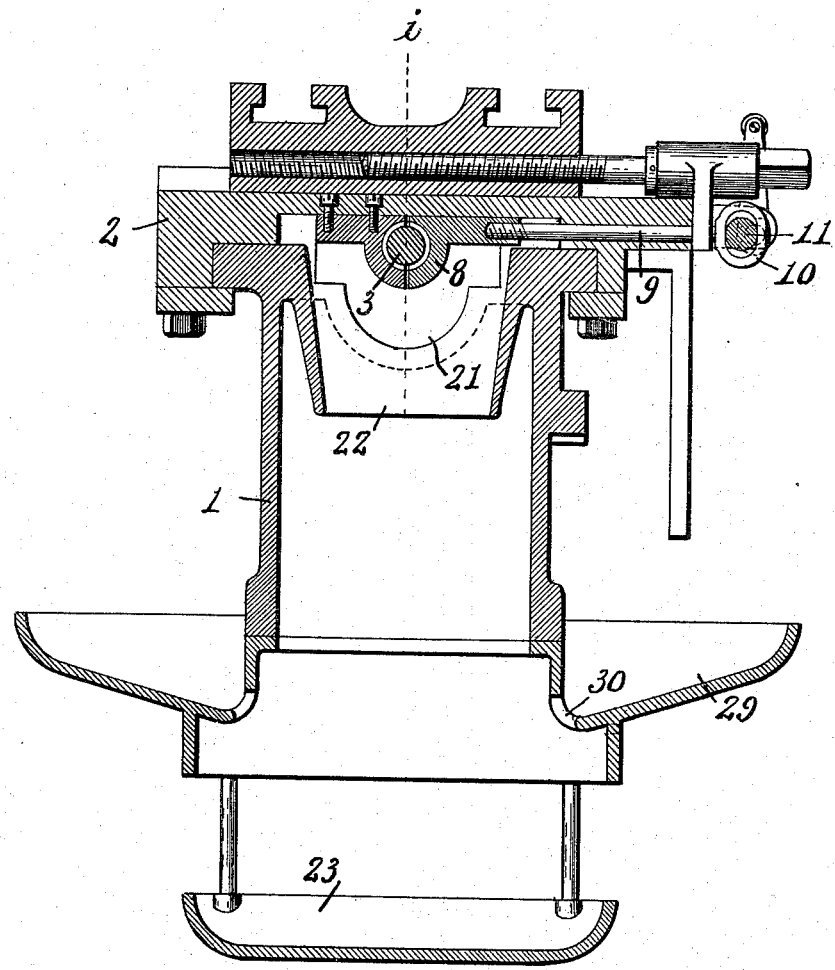
Figure 8:
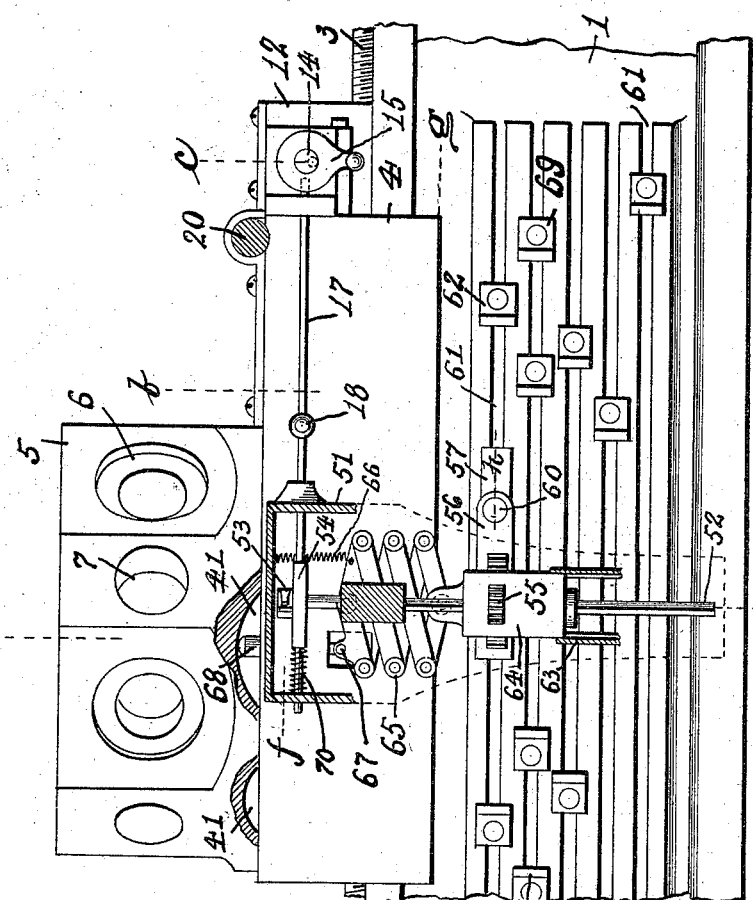
Figure 9:
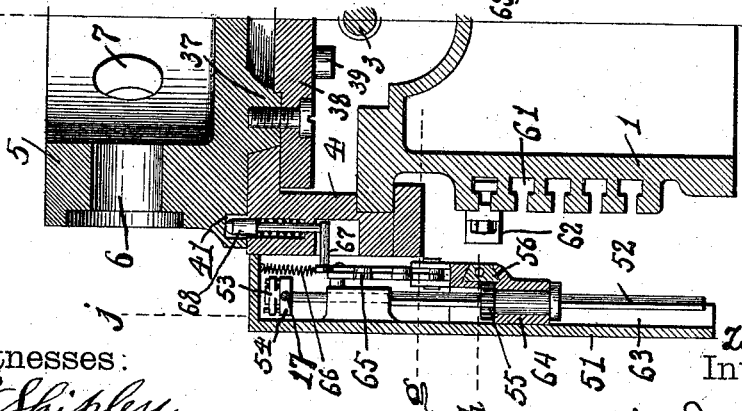

Figure 1, is a front elevation of a lathe exemplifying my invention; Fig. 2, a vertical longitudinal section of the same, the plane of section being elsewhere in the drawings indicated by line $i$; Fig. 3, a plan; Fig. 4, a vertical transverse section, the plane of section being indicated elsewhere in the drawings by lines $a$; Fig. 5, a perspective view of a portion of the turret-saddle and of the turret pawl-block; Fig. 6, a plan of the oil-pan; Fig. 7, an end view of the turret-saddle showing the turret nut-box in vertical section in the plane of lines $c$; elsewhere shown in the drawings; Fig. 8, a front elevation of the portion of the bed of the lathe, at the turret-saddle, parts appearing in vertical section in the planes of lines $j$ and $k$ seen elsewhere in the drawings; Fig. 9, a vertical transverse section of a portion of the bed and turret-saddle and turret in the planes of lines $b$ and $e$; Fig. 10, a plan of portions of the turret-saddle and turret, the turret-apron appearing in horizontal section in the planes of lines $f$; Fig. 11, a horizontal section of part of the bed and the turret-apron in the plane of lines $g$; and Fig. 12, a similar horizontal section in the plane of lines $h$.

Section planes are indicated wherever practicable and marked by the reference letters above noted.

In the drawings:—1, indicates the usual bed; 2, the tool-carriage; 3, the feed-screw mounted centrally in the top of the bed and arranged to be driven in an ordinary manner so that its direction and rate of turning may be altered; 4, the turret-saddle; 5, the turret; 6, the usual tool-receiving holes in the turret, there being an odd number of these holes, five in the example, so that when a tool is brought to operative position in the axis of the lathe the diametrically opposite portion of the turret will be a blank space between two tools; 7, holes in these blank spaces between the tool-receiving holes, at the level of the axis of the lathe, whereby long work projecting into and through a given operating turret-tool may project on across the turret and through the opposite side thereof and as far beyond the turret toward the tail of the lathe as required, these holes being adapted to receive supporting bushings; 8, (Fig. 4) a sliding half-nut in the tool-carriage 2, engaging the feed-screw 3 and arranged for horizontal sliding motion so as to open and shut on the feed-screw; 9, a rod fast to this half-nut and projecting outwardly in front of the carriage; 10, a slotted loop on the front end of this rod; 11, a handled eccentric mounted on the front of the tool-carriage and engaging the loop 10 whereby the half-nut 8 may be opened and shut; 12, (Figs. 3 and 7) a nut-box secured against the tail end of the turret-saddle 4; 13, a half-nut arranged to slide in this nut-box to open and shut on the feed-screw, the same feed-screw therefore serving for the tool-carriage and for the turret. 14, a shaft journaled in the nut-box and extending out to the front of the turret-saddle, the inner end of this shaft having an eccentric pin engaging a slot in the half-nut 13, so that the turning of the shaft opens and shuts the nut; 15, a handle on the front end of this shaft by means of which it may be operated; 16, a spring connected with shaft 14 and tending to turn that shaft to the position corresponding with the open position of half-nut, 13; 17 (Fig. 3) a latch-rod mounted in bearings at the front of the turret and capable of endwise motion, the tail end of this rod engaging a hole in hub of handle 15 when the handle is in position corresponding with the closed condition of half-nut 13; 18, a handle on latch-rod 17; and 19, (Fig. 2) telescopic jacket tubes surrounding the feed-screw between the head-stock and the tool-carriage and again between the tool carriage and the turret-saddle, these telescopic systems being fastened at their ends appropriately to the head-stock, tool-carriage and turret-saddle, whereby the feed screw is entirely covered between the head-stock and turret-saddle.

There will be as many of the telescopic sections of jacket tubes and of such length as the operating length of the lathe requires, the sections to be made short enough to permit the tool-carrying parts to have proper closeness of approach to other parts, and there being a sufficient number of sections to permit of the desired extent of operation of the tool-carrying parts. The half-nut on the turret-saddle being open the feed-screw may be employed in operating the tool-carriage alone in the usual way, and by leaving the half-nut on the tool-carriage open the feed-screw may be employed in giving feeding motion to the turret-saddle alone. The half-nut on the turret-saddle being shut upon the screw is held in that position by latch-rod 17 being shifted to the right to latching position. By moving the rod to the left to unlatching position the spring 16 will open the nut quickly, thus permitting stops to be made sharply at shoulders being turned upon work by the turret-tools. Provision is made for effecting this opening of the turret-nut automatically as controlled by adjustable stops as will be later hereinafter explained.

Proceeding with the drawings:—20, indicates the usual gearing, &c., by means of which the turret-saddle may be fleeted by hand when it is unlocked from the feed-screw; 21, (Fig. 2) a sloping longitudinal gutter formed in the center of the lathe-bed and adapted to catch the oil and cuttings; 22, a large outlet port at the lowest portion of this gutter discharging down through the bed of the lathe; 23, an oil-pan suspended by studs underneath the bed of the lathe in position to catch the oil and cuttings dropping from the port 22, this oil-pan sloping toward one end; 24, a catch-box under the lower end of the oil-pan; 25, a screen over the top of the catch-box at the foot of the slope of the oil-pan, this screen intercepting the ordinary cuttings but allowing the oil and powdered cuttings to go to the catch-box; 26, an oil-tank alongside the catch-box, the two being separated by a single partition; 27, an overflow hole in the partition separating the catch-box from the oil-tank and located at the top of the catch-box; 28, a removable cover over the the oil-tank; 29, a trough extending entirely around the base of the bed of the lathe and projecting outwardly far enough to catch any droppings from the working parts of the lathe, this trough sloping at the front and back of the lathe to a low point; 30, a port in the back and front wall of the lathe-bed, draining from the low points in gutter 29 to the oil-pan, whereby oil and cuttings reaching the gutter may flow to the oil-pan; 31, (Fig. 1) the usual oil feed-pump; 32, the suction-pipe for the oil-pump, taking from the oil-tank 26; 33, the usual oil discharge-pipe from the pump; 34, the usual branches from this discharge-pipe to carry the oil to the tools, as by means of hose or the like; 35, the usual by-pass oil pipe to carry to the oil-tank such excess of oil as the pump may send forward over what is required by the tools; and 36, the usual by-pass valve permitting this excess flow of oil to flow to the oil-tank.

From Fig. 2 it will be seen that the feed-screw is well protected and that the oil and cuttings may find their way to the oil-pan 23, the oil and powdered cuttings going to catch-box 24, leaving the heavy cuttings to be removed from the oil-pan and from trough 29. The powdered cuttings settle in catch-box 24 and the cleared oil overflows through opening 27 into the oil-tank 26 from which it is again drawn by the pump.

Proceeding with the drawings:—37, (Fig. 9) indicates a circular boss projecting from the base of the turret and fitting nicely into a hole in the top of the turret-saddle, this boss forming the vertical journal on which the turret turns; 38, a disk bolted to the lower face of the boss 37 and projecting outwardly under the top wall of the turret-saddle, this projection serving to prevent the lifting of the turret; 39, the turret-teeth by means of which the usual pawl turns the turret, these teeth being in the form of pins projecting downwardly from disk 38, there being a pin for each tool-hole in the turret; 40, (Fig. 10) lock-notches in the periphery of disk 38, one for each tool-hole of the turret; 41, segmental notches in the lower face of the turret, one notch for each tool-hole in the turret, minus one, these notches being of dissimilar depths; 42, (Fig. 5) the locking-bolt sliding in a guide-way in the turret-saddle, its end engaging, selectively, the lock-notches 40 in the disk 38, the guide-way in which this locking-bolt slides being open at the top of the turret-saddle and being covered by a removable cover-plate which serves also in keeping the locking-bolt down in place; 43, a spring urging the locking-bolt endwise to locking position; 44, a bell-crank lever mounted in the turret-saddle, one of its arms engaging the locking-bolt, and its other arm projecting tailward of the lathe and having a downwardly projecting prong; 45, a pawl-block arranged to slide in that portion of the lathe-bed upon which the turret-saddle slides; 46, a screw mounted in the lathe-bed for adjusting the pawl-block 45 along the bed to selective positions; 47, the turret-pawl, pivoted to the turret-block 45 and presenting its end in position to engage one of the turret-pins 39 when the turret-saddle is moved properly back toward the tail of the lathe; 48, a spring holding the turret-pawl upward into engaging position and permitting the pawl to sink and make room for the succeeding turret-pin to pass as usual, the pawl being pivoted to the pawl-block on a horizontal pivot, the heel of the pawl seating in a counterbore in the block to receive the thrust of the pawl; 49, a switch-block pivoted on top of pawl-block 45 and having a prong projecting downward into a slot in the block; and 50, a spring in a recess in the under surface of the pawl-block and engaging the prong on the switch-block and pressing the advanced end of the switch-block inwardly.

In Fig. 5 the locking-bolt 42 is assumed as in engagement and locking the turret and held by spring 43. If the turret-saddle be moved tailward of the lathe the prong on bell-crank lever 44 will ride the outer incline of switch-block 49, whereby the bell-crank lever will be moved and the locking-bolt withdrawn, thus releasing the turret. The tailward motion of the turret-saddle being continued, pawl 47 is engaged by a turret-pin and the turret is turned, the prong on the bell-crank lever meanwhile passing beyond switch-block 49 thus leaving spring 43 free to shoot the locking-bolt endwise when a turret-notch comes opposite it. This again locks the turret and the turret-saddle can have no further tailward motion. The turret has been turned one space and when the turret-saddle is again moved toward the head of the lathe pawl 47 sinks as a succeeding turret-pin rides over it, and the prong of the bell-crank lever 44, having moved inwardly, rides along the inner face of switch-block 49 which yields outwardly to permit its passage and then returns to normal position. Pawl-block 45 may be shifted to different positions along the lathe-bed so that the turning of the turret may take place at desired time.

Proceeding with the drawings:—51, (Figs. 8 and 9) indicates an apron secured to the front face of the turret-saddle; 52, a non-circular shaft journaled vertically behind this apron and projecting down near the side of the lathe-bed; 53, (Fig. 10) a two-armed hub fast on the upper end of this shaft; 54, a slotted plate forming a part of latch-rod 17 where the rod extends across the turret-apron in the plane of shaft 52, the slot in the plate permitting the passage of the shaft and the endwise movement of the latch-rod, this plate having a pin projecting up at the face of each arm of the two-armed hub, whereby when shaft 52 is turned in either direction the effect will be to draw the latch-rod 17 to the left and permit the feed-nut of the turret-saddle to open, a spring 70 urging the latch-rod to latching position; 55, (Fig. 11) a pinion sliding on the shaft 52; 56, a rack-bar geared to this pinion and having a sliding bearing in the carriage which supports the pinion; 57, a tappet-block carried on the forward end of a spindle sliding in and out in a socket in rack-bar 56; 58, a projection from the inner face of this tappet-block, whereby the tappet-block is provided with four tappet surfaces, one at each end extremity of the tappet-block and one at each end of the projection 58; 59, a spring detent plunger mounted in rack-bar 56 with its end engaging a selected one of three detent sockets in the spindle of tappet-block 57 whereby the tappet-block can be held in any one of three selected positions with relation to the front face of the lathe-bed; 60, a handle on the outer end of the spindle of the tappet-block to serve in moving the tappet-block into its desired inward or outward position; 61, a vertical series of horizontal T-slots upon the front face of the lathe-bed; and 62, projecting stops secured in adjusted position in these T-slots, to the right or to the left or to the right and left of the turret-apron, the projection of these stops being such that when the tappet-block 57 is at the extreme inner one of its three positions the ends of tappet-projection 58 will engage a stop 62.

In Figs. 8 and 9 it will be noticed that tappet-block 57 is in the plane of the upper ones of the series of stops. Let it be assumed for the present that the tappet-block cannot be changed from that level and that it is designed to co-operate only with stops arranged in the upper one of the slots 61. As the tappet-block appears in Figs. 11 and 12 it is in its farthest out position and will clear the stops and be without office. If, in Fig. 11, handle 60 be pushed inward to bring the tappet-block to its farthest inward position, then projection 58 will be in position to strike stops 62. The effect of the stop being struck as the turret-saddle is traveling, in either direction, is to slide the rack-bar 56 and partially rotate shaft 52 and turn the two-armed hub 53 and withdraw latch-rod 17 and permit the turret-saddle feed-nut to open and the turret feed to stop. The stops 62 are set as desired and the consequence is that the turret-feed, in either direction, may be automatically arrested at a definite point. It sometimes happens in the use of turret-lathes that a box-tool is employed of a nature to turn, alternatively, two different sizes of work. For instance, the tool may be turning a certain diameter and then, by a manipulation, the tool may move outward and produce a larger diameter. Each of these diameters upon the work may require a definite stopping point, one being beyond the other on the work, perhaps some distance beyond it, perhaps a mere trifle. Examining Fig. 11 there will be noticed a second pair of stops 69 of greater forward projection than the stops 62. Assume the tappet-block 57 to be pushed clear in and the turret feeding to the left, projection 58 will strike the left stop 62 and the turret-feed will be arrested. Let this stopping point represent one shoulder on the work produced by a certain turret-tool. Now assume the same turret-tool to be manipulated to produce say, a larger diameter and let the tappet-block be pulled outward to its second position. Projection 58 on the tappet-block will then pass the shorter stop and the extreme end of the tappet-block at the left will come in contact with the longer stop 69 at the left, and again arrest the turret-feed, this stopping point representing the second shoulder on the work. If the tappet-block be given its farthest withdrawal position then it will clear all the stops. Thus it will be seen that provision is made for automatically stopping the turret-feed when the turret is feeding in either direction, and for adjusting the stopping positions, and for two stopping positions in either direction; and it is also obvious that provision may be made for increasing the number of measured shoulders on the work by carrying forward the idea of tappet projections on the tappet-block and using a multiplicity of stops of dissimilar projections, the tappet-block being shifted in and out to such position as to engage the desired stop. It will be judged from Figs. 11 and 12 that the stops 62 and 69 take up some room on their T-slots and that there is a limit to the closeness with which their operating surfaces can be brought to each other. If the long stops and short stops were arranged to make contact with the same part of the tappet-block it is obvious that shoulders on work would have to be apart a distance equal to the length of the inner stop; but by lengthening the tappet-block so that its extremity is a distance from the engaging surface of projection 58 equal to the total length of the inner stop, it is possible to cause the two feed stoppings and, consequently, the two shoulders on the work to occur as closely together as is desired. Thus far only the upper one of the T-slots 61 has been considered, the tappet-block being in line with that slot. This is all right for one turret-tool, but when other turret tools are brought into action it is quite likely that other stopping points will be called for. This of course may be provided for by simply shifting the stops in the slot, but I provide a separate set of stops for each turret-tool and I arrange that the turning of the turret to bring a given turret-tool into active position shall raise or lower the tappet-block to bring it into line with the appropriate set of stops. This matter will now be explained.

Proceeding with the drawings:—63, indicates a vertical guide-way in the turret-apron 51; 64, the bearing of pinion 55 and rack-block 56, this bearing forming a carriage sliding in the guide-way 63 to permit the tappet-block to be brought to the level of any set of stops; 65, a lazy-tongs with the upper part of the system pivoted to the apron and the lower part pivoted to the carriage 64; 66, a spring attached to the lazy-tongs and holding the lazy-tongs in contraction and holding carriage 64 clear up with the tappet-block in line with the top row of stops; 67, a pin projecting inwardly from the upper member of the lazy-tongs and extending inwardly under the rim of the turret, to that radial distance which will bring the end of the pin under the annular series of segmental recesses 41, which have been heretofore referred to; 68, a spring-plunger seated in the turret-saddle, its lower end resting on pin 67 and its upper end going up into one of the recesses 41; 69, the second or greater projecting stops heretofore referred to, and 70, the spring on the latch-rod 17, the stops 69 and spring 70 having been heretofore referred to out of their numerical order.

Normally, a certain turret-tool is in the active position and the deepest one of segmental recesses 41 is at the plunger 68, and the tappet-block is in its uppermost position in line with the upper one of the T-slots, that T-slot and its stops being the ones appropriate to the particular turret-tool in question. In this condition that turret-tool can be used in connection with its stops in the manner before explained. Now let the turret be turned one space to bring a second turret-tool into active position. This turning of the turret forced plunger 68 down and its limit of descending motion, multiplied by the lazy-tongs, pushed carriage 64 clear down till the tappet-block was in line with the lowest set of stops, but when the second turret-tool arrived at its operating position, a second recess 41 was brought to the plunger 68 and the plunger rose as far as permitted by the peculiar depth of that recess; and that recess, pertaining to the second turret-tool, was such as to bring the tappet-block in line with the second set of stops from the top. This second turret-tool may now be used in connection with its appropriate set of stops. When the third turret-tool is brought to operating position the tappet-block is again lowered and then comes up and stops in line with the third set of stops from the top, the third recess in the turret being of appropriate depth. When the fourth turret-tool is brought into operating position the appropriate recess puts the tappet-block in line with the fourth set of stops from the top. For the fifth turret-tool there is no recess for the plunger and consequently the tappet-block will not rise after being depressed but will remain in line with the lowermost set of stops. The putting of a given turret-tool into operating position therefore brings the feed-arresting parts into active position, and the putting of that tool out of operating position suppresses the feed-arresting action pertaining to that tool, and the selecting of any turret-tool for operation automatically brings into action feed-arresting parts pertaining to the selected turret-tool. The particular mechanism illustrated and described for accomplishing this is to be looked upon merely as an exemplification of the invention.

I claim as my invention—

1. In a turret-lathe, the combination, substantially as set forth, of a turret-saddle provided with an open-and-shut nut, a tool-carriage provided with an open-and-shut nut and disposed between the turret-saddle and the head-stock, a feed-screw engaging both said open-and-shut nuts, and mechanism for moving and holding said turret-saddle and tool-carriage independent of said feed-screw.

2. In a turret-lathe, the combination, substantially as set forth, of a tool-carriage and turret-saddle mounted to slide on the lathe-bed, a feed-screw mounted in the top of the lathe-bed, and telescopic tubes attached to the head-stock and tool-carriage and turret-saddle and surrounding the feed-screw between the head-stock tool-carriage and turret-saddle.

3. In a lathe, the combination, substantially as set forth, of a feed-screw, a tool-carrying part provided with an open-and-shut nut engaging said feed-screw, a handled cam for shutting said nut upon the feed-screw, a sliding latch-rod at right angles to said cam and engaging a detent hole in the same and serving to lock said cam in position corresponding with the closed condition of said nut, and a spring arranged to turn said cam and open said nut.

4. In a turret lathe, the combination, substantially as set forth, of a turret-saddle, a turret mounted thereon and provided with teeth and lock-notches, a lock-bolt carried by the turret-saddle and arranged to slide parallel with the path of the turret-saddle, a bell-crank lever pivoted in the turret-saddle and engaging said locking-bolt and presenting an arm tailward of the lathe, a pawl supported by the lathe-bed in position to be engaged by the turret-teeth, a spring switch-piece supported by the lathe-bed in position to be engaged by the tailward projection of said bell-crank lever, and a screw for adjusting said pawl and switch-piece simultaneously along the lathe-bed.

5. In a turret-lathe, the combination, substantially as set forth, of a turret-saddle, a turret mounted thereon and provided with teeth and lock-notches, a lock-bolt and operating lever carried by the turret-saddle, a pawl-block arranged to slide along the lathe-bed and have the turret-saddle slide over it, a screw for adjusting the pawl-block along the lathe-bed, and a pawl and swing switch-block carried by the pawl-block.

6. In a turret-lathe, the combination, substantially as set forth, of a turret-saddle, an open-and-shut nut thereon to engage the feed-screw of the saddle, a cam for opening and closing the nut, a spring to turn the cam to open position, an endwise moving latch-rod to hold the cam in shut position, a vertical shaft carried by the turret-saddle, an armed hub carried by said shaft and engaging a pin on said latch-rod, a pinion on said shaft, a sliding rack-bar engaging said pinion and carrying a tappet-block, and an adjustable stop mounted on the lathe-bed and adapted to be engaged by said tappet-block.

7. In a turret-lathe, the combination, substantially as set forth, of a turret-saddle, a latch-rod carried thereby and arranged to release the feed motion by endwise movement, a vertical shaft carried by the saddle, a two armed hub on said shaft engaging pins on said latch-rod, a pinion on the vertical shaft, a sliding rack-bar engaging the pinion and carrying a tappet-block, and a pair of stops carried by the lathe-bed, one to the right and one to the left of said tappet-block, and adapted to be engaged by the same.

8. In a turret-lathe, the combination, substantially as set forth, with the feed-releasing mechanism of the turret-saddle, of a tappet-block carried by the turret-saddle and arranged for endwise motion with reference thereto and connected with said releasing mechanism and having a tappet-projection on its face, a stop mounted for longitudinal adjustment on the lathe-bed and adapted to engage the extremity of said tappet-block, and a second stop mounted for adjustment on the lathe-bed and having less outward projection than the first mentioned stop and adapted to engage said tappet-projection of the tappet-block.

9. In a turret-lathe, the combination, substantially as set forth, of a stop arranged for longitudinal adjustment on the lathe-bed, a tappet-block carried by the turret-saddle and connected with the feed-release mechanism thereof and capable of motion to and from the lathe-bed, so as to alternatively engage or clear said stop and a handle and detent for securing said tappet-block in adjusted inward and outward position.

10. In a turret-lathe, the combination, substantially as set forth, of a turret-saddle, a feed-release mechanism carried thereby, a series of longitudinally adjustable stops rigidly supported by the lathe-bed, a tappet-block carried by the turret-saddle and forming a part of the feed-release mechanism, and means for adjusting said tappet-block across said series of stops and into line with any of the stops of said series.

11. In a turret-lathe, the combination, substantially as set forth, of a lathe-bed provided with a vertical series of longitudinal grooves for feed stops, a turret-saddle carrying feed-release mechanism, and a tappet-block carried by the turret-saddle and mounted for vertical adjustment into the plane of any selected one of said series of stop-grooves.

12. In a turret-lathe, the combination, substantially as set forth, of a lathe-bed provided with a vertical series of longitudinal stop-grooves, a turret-saddle, a vertical shaft carried by said turret-saddle and connected with the feed-release mechanism of the turret-saddle, a vertical guide-way carried by the turret-saddle, a carriage mounted for vertical adjustment in said guide-way, a pinion on said shaft and mounted in said carriage, a rack-bar mounted in said carriage and engaging said pinion, and a tappet-block carried by said rack-bar.

13. In a turret-lathe, the combination, substantially as set forth, of a turret-saddle, a feed-release mechanism carried thereby, a turret mounted on the turret-saddle, a stop carried by the lathe-bed to actuate the feed-release mechanism, a tappet carried by the turret-saddle to engage said stop and operate the feed-release mechanism, and connections between said tappet and turret whereby the turning of the turret throws the tappet out of line with the stop.

14. In a turret-lathe, the combination, substantially as set forth, of a series of longitudinally adjustable stops carried by the lathe-bed in different planes, a turret-saddle, a feed releasing tappet carried by the turret-saddle and adapted to be moved into any one of said stop-planes, a moving part connected with said tappet and in position to be engaged by the turret, and a turret provided with surfaces in dissimilar planes to engage said moving part and shift said tappet in correspondence with the angular position of the turret.

15. In a turret-lathe, the combination, substantially as set forth, of a series of stops carried by the lathe-bed in different planes, a turret-saddle, a feed-releasing tappet carried by the turret-saddle and adapted to be shifted into any one of the said stop planes, a turret mounted on the turret-saddle and provided with a series of surfaces in dissimilar planes, a plunger carried by the turret-saddle and adapted to engage said surfaces selectively, and a motion-multiplying device, as a lazy-tongs, connecting said plunger with said tappet whereby the turning of the turret shifts said tappet to an appropriate one of said stop planes.

ZORESTER B. COES.

Witnesses:
J. W. SEE,
SAM. D. FITTON, Jr.